United States Patent [19]

Imaide

[11] Patent Number: 4,688,085
[45] Date of Patent: Aug. 18, 1987

[54] ENHANCED SENSITIVITY COLOR VIDEO CAMERA WITH REDUCED RED COMPONENT IN SECOND LUMINANCE SIGNAL

[75] Inventor: Takuya Imaide, Yokohama, Japan

[73] Assignee: Hitachi, Ltd., Tokyo, Japan

[21] Appl. No.: 755,684

[22] Filed: Jul. 16, 1985

[30] Foreign Application Priority Data

Aug. 13, 1984 [JP] Japan .................................. 59-167875

[51] Int. Cl.$^4$ ........................ H04N 9/07; H04N 9/67; H04N 5/30
[52] U.S. Cl. ........................................ 358/44; 358/43; 358/30; 358/211
[58] Field of Search ..................... 358/44, 41, 43, 211, 358/30, 29, 47

[56] References Cited

U.S. PATENT DOCUMENTS

| 4,016,597 | 4/1977 | Dillon et al. ............................. 358/41 |
| 4,160,264 | 7/1979 | Hailey et al. ........................... 358/30 |
| 4,246,601 | 1/1981 | Sato et al. ............................... 358/47 |
| 4,437,111 | 3/1984 | Inai et al. ............................... 358/44 |

FOREIGN PATENT DOCUMENTS 114588 7/1983 Japan ..................................... 358/15

OTHER PUBLICATIONS

Takemura, "CCD 2-Plate Style Color Television Camera", published by The TV Scientific Society of Japan, vol. 33, Section 7, 1979.

Primary Examiner—Tommy P. Chin
Assistant Examiner—Robert M. Bauer
Attorney, Agent, or Firm—Fay, Sharpe, Beall, Fagan, Minnich & McKee

[57] ABSTRACT

A color video camera uses an infrared cut-off filter, a complementary filter and a solid state image pick-up device. The infrared cut-off filter cuts off near infrared light of image above a wavelength $\lambda c$, which is set in the range of 670 nm$\leq \lambda c \leq$780 nm. A color sampling-/generating circuit has a matrix circuit connected to the solid state image pick-up device for providing a first luminance signal, a second luminance signal, a red channel signal and a blue channel signal. The second luminance signal is used for producing a red color difference signal and a blue color difference signal by using the red channel signal and the blue channel signal in a processing circuit. In the matrix circuit, matrix coefficients for producing the second luminance signal are set to reduce the red component of the second luminance signal. Further, the red color difference signal below a predetermined value is extracted and added to the first luminance signal to reduce the red component of the first luminance signal.

22 Claims, 16 Drawing Figures

Fig.1a

| G | R |
|---|---|
| B | G |

Fig.1b

| W  | G  |
|----|----|
| Cy | Ye |

Fig.2

| $n_1$ | $n_2$ |
|-------|-------|
| $n_3$ | $n_4$ |

Fig.3

| $n'_1 - n'_2$ | $n'_4 - n'_5$ |
|---------------|---------------|
| $n'_2 - n'_3$ | $n'_5 - n'_6$ |

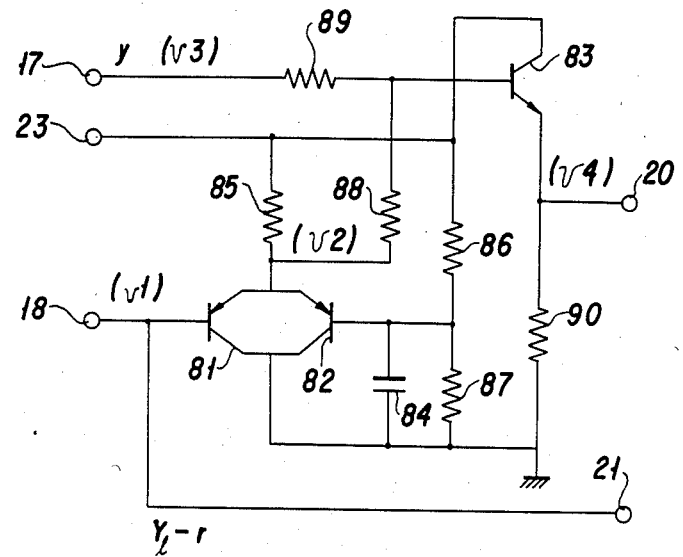
Fig.11
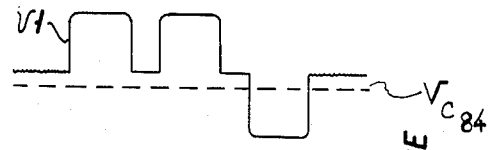
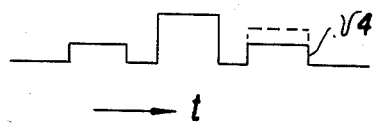

ENHANCED SENSITIVITY COLOR VIDEO CAMERA WITH REDUCED RED COMPONENT IN SECOND LUMINANCE SIGNAL

BACKGROUND OF THE INVENTION

The present invention relates to a color video camera, especially a color video camera having a high sensitivity.

Recently, color video cameras using solid state image pick-up devices having a two dimensional array of photo-electric elements have become popular as a result of the popularization of video cassette recorders (VCRs). It is well known that a complementary filter for transmitting colors: cyan (Cy), yellow (Ye) or magenta (Ma), can be utilized as a color filter in the color video camera to increase the sensitivity of color video cameras using solid state photo-sensitive devices. For example, such filters are described in Nabeyama et al.: All solid state color camera with single-chip MOS imager: IEEE Tr. on CE, Vol. CE. 27 (Feb., 1981), Ohba et al.: MOS Imaging Random Noise Suppression: ISSCC Digest, P26 (Feb., 1984), or Sato et al.: U.S. Pat. No. 4,246,601 (issued on Jan. 20, 1981).

If red (R), Green (G) and Blue (B) are considered to be three primary colors, then Cy is a complementary color to R, that is, R and Cy are mixed to form white (W). Ma and Ye are the complementary colors to G and B, respectively. The complementary filter described in this specification can have separate color filter elements for transmitting each of the colors Cy, Ye and Ma, or a color filter comprising the color filter elements. Also, in this specification, a primary color filter can have separate color filter element for transmitting each of the colors R, G and B, or a color filter comprising the separate color filter elements. When a complementary filter is utilized, the luminance S/N ratio becomes about 6 dB higher than when a primary color filter is used.

The cause will be described hereinafter. FIG. 1a illustrates an explanatory view showing the arrangement of a primary color filter as the color filter of the color video camera, and FIG. 1b similarly illustrates the arrangement of a complementary filter. In this Figure, G, R, B, W, Cy and Ye respectively denote green, red, blue, transparent (white), cyan and yellow color filters, and also denote image signals for one picture element.

A luminance signal $y_p$ of an image or an object is provided by adding the signals for four picture elements transmitted through the four filters indicated in FIG. 1a and the following formula is derived;

$$y_p = B + 2G + R \tag{1}$$

Similar to the above, a luminance signal $y_c$ of the image is provided by adding the signals for four picture elements transmitted through the four filters indicated in FIG. 1b and the following formula is derived;

$$y_c = W + G + C_y + Y_e \tag{2}$$
$$= (R + G + B) + G + (B + G) + (R + G)$$
$$= 2(R + 2G + B) = 2y_p$$

Moreover, there is no need to repeatedly indicate that the W filter can pass R, G and B and that the $C_y$ filter can pass B and G and $Y_e$ can pass R and G.

Comparing formula (1) with (2), it is evident that the received image signal quantity can be doubled when complementary filters are employed.

When the complementary filter arrangement indicated in FIG. 1b is employed, a red channel signal $r_c$ can be derived from the following formula;

$$r_c = W - G - C_y + Y_e = 2R \tag{3}$$

Similarly, a blue channel signal $B_c$ can be derived from the following formula;

$$B_c = W - G + C_y - Y_e = 2B \tag{4}$$

In the primary color filter arrangement indicated in FIG. 1a, a red channel signal $r_p$ and a blue channel signal $b_p$ respectively have relations of $r_p = R$ and $b_p = B$. The following formulas are derived:

$$r_c = 2r_p \tag{5}$$

$$B_c = 2b_p \tag{6}$$

These formulas (5) and (6) indicate that the signal quantity of the color channel signals can be doubled when complementary filters are employed, compared with employing primary color filters.

Next, the noise for each color channel will be studied. FIG. 2 illustrates a schematic explanatory view showing random noise in the four filters, more exactly, corresponding to the four picture elements.

In the case of the previously cited prior art of Nabeyama et al., each of the four color filters provides an independent readout signal when converting the image transmitted through the color filters into an electrical signal and then it is read as the amplitude of the electric charge. Thus, there is no relation among the noise signals n1 to n4 in the respective filters.

When employing the complementary filters shown in FIG. 1b as the color filter, a random noise $n_{yc}$ of the luminance signal, a random noise $n_{rc}$ of the red channel signal and a random noise $n_{bc}$ of the blue channel signal are respectively expressed as follows;

$$n_{yc} = n1 + n2 + n3 + n4 \tag{7}$$

$$n_{rc} = n1 - n2 - n3 + n4 \tag{8}$$

$$n_{bc} = n1 - n2 + n3 - n4 \tag{9}$$

It is evident that these formulas (7) to (9) can be derived by referring to the above-stated formulas (2) to (4).

Next, in the case of employing a primary filter such as indicated in FIG. 1a as the color filter, random noise $n_{yp}$ of the luminance signal, random noise $n_{rp}$ of the red channel signal and random noise $n_{bp}$ of the blue channel signal are respectively expressed as follows;

$$n_{yp} = n1 + n2 + n3 + n4 \tag{10}$$

$$n_{rp} = n2 \tag{11}$$

$$n_{bp} = n3 \tag{12}$$

As indicated above, it is evident that random noise in the color channel signal is doubled, that is, its power is quadrupled, when employing the complementary filter compared with employing the primary color filter. Considering that the signal strength is doubled by employing a complementary filter, S/N ratios are improved to 6 dB in the luminance signal and 0 dB in the color channel signals by the complementary filter. The improvement of the color S/N ratios in the color video camera utilizing the complementary filter is deemed to be effectual in improving the sensitivity of the camera.

Next, we will consider the case where there is a relationship between the random noise values in the filters, that is, the picture elements.

The above-mentioned prior art by Ohba et al. is designed to use a common read-out signal, that is, one signal line extending vertically used for two vertically adjacent picture elements of a two dimensional array of picture elements, that is, photo electric elements, for example, W and $C_y$. Since random noise is mainly caused when the charges are transferred from the signal line to a horizontal transfer section, there is a correlation for random noise between the vertically adjacent picture elements.

The signals corresponding to FIG. 3 schematically show the correlation. In FIG. 3, n1' denotes the noise on the vertical signal line caused after unnecessary signals such as a vertical smear signal are swept away from the vertical signal line to the outside prior to reading out the signal W, n2' denotes the noise on the vertical signal line caused after the signal W was transferred to the horizontal transfer section, n3' denotes the noise on the vertical signal line caused after the signal $C_y$ was transferred to the horizontal transfer section, and n4' to n6' denote the noise on a next vertical signal line, corresponding to G and Ye, respectively. In this instance, as indicated in FIG. 3, the noise of W and $C_y$ is (n1'−n2') and (n2'−n3'), respectively, and the correlation between them is established.

The random noise for respective signals is given by the following formulas;

$$n'_{yc} = n1' - n3' + n4' - n6' \quad (13)$$

$$n'_{rc} = n1' - 2n2' + n3' - n4' + 2n5' - n6' \quad (14)$$

$$n'_{bc} = n1' - n3' - n4' + n6' \quad (15)$$

Thus, it is understood that the noise $n'_{rc}$ of the red channel signal has three times the power of $n_{bc}$ of the blue channel signal, that is, greater by about 5 dB.

Camera sensitivity can be improved by improvement of the S/N ratio of the red channel signal in the color filter arrangement indicated in FIG. 1b. If Cy is replaced with $Y_e$, the noise $n_{bc}$ of the blue channel signal is greater than that of the red channel signal. However, this color filter arrangement is disadvantageous because of moiré in the luminance signal, and the filter arrangement indicated in FIG. 1b is usually employed.

As mentioned above, in a color video camera using a solid state image pick-up device, it will be effective to improve the S/N ratio of the red channel signal in order to increase the sensitivity. For that purpose, an infrared cut-off filter having a higher cut-off characteristic than the prior art can be used. However, that would raise another problem mentioned hereinafter.

FIG. 4 shows a graph of spectral sensitivity of the solid state image pick-up elements formed on a silicon (Si) chip. This graph is a large scale linear-approximation for simplification. The data is measured by attaching the solid state image pick-up elements (MOS transistor-type) used in the aforementioned prior art to the complementary filter indicated in FIG. 1b and then using a 3200° K. halogen lamp and a beryl filter. In this graph, the abscissa denotes wavelength and the ordinate denotes relative sensitivity. In this Figure, the real line denotes the sensitivity corresponding to W and the dotted line denotes the sensitivity corresponding to G. The characteristic traced by the dotted line on the left and the solid line on the right denotes the sensitivity corresponding to Ye. The characteristic traced by the solid line on the left and the dotted line on the right denotes the sensitivity corresponding to Cy.

The spectral sensitivity characteristics of the luminance signal y, the red channel signal r, and the blue channel signal b can be obtained by substituting the spectral sensitivity characteristics indicated in FIG. 4 into the above-mentioned formulas (2) to (4). The result obtained thereby is shown in FIG. 5.

In this Figure, the sensitivity corresponding to y is denoted by a solid line; the sensitivity corresponding to r is denoted by a dotted line on the left and a solid line on the right; and the sensitivity corresponding to b is denoted by a solid line on the left and a dotted line on the right.

In the conventional prior art, the spectral sensitivity characteristics of y, r and b, which correspond approximately to the standard color specification system defined by CIE (Commission Internationale de l'Echairage (International Commission of Illumination)), are obtained by cutting off the wavelength $y_c$, which is over 630 to 650 nm, with a near infrared light cut-off filter. It is necessary to standardize the spectral sensitivity indicated in FIG. 5 by dividing the spectral components of the halogen lamp so as to compare said spectral sensitivity with stimulus values of the standard color specification system.

The examples of spectral sensitivity characteristics including conventional near infrared cut-off filters are described in Takemura et al.: CCD 2-plate-style color television camera: TV Scientific Society of Japan, Vol. 33, Section 7, page 28 (1979). Also, in the prior art, for example, T. Inai et al., U.S. Pat. No. 4,437,111 (issued on Mar. 13, 1984), a color video camera using a pick-up tube and an infrared cut-off filter is disclosed.

Therefore, it is clear that to increase the sensitivity of a color video camera, especially a one using a solid state image pick-up device, the S/N ratio of the red channel signal must be improved by using an infrared cut-off filter having a higher cut-off frequency. It is also clear that the spectral sensitivity of the color video camera will deviate from the standard color specification system defined by CIE when the S/N ratio of the red channel signal is thus improved.

SUMMARY OF THE INVENTION

It is an object of the present invention to provide a color video camera having a high sensitivity.

It is another object to provide a color video camera having a red channel signal with a high S/N ratio.

It is another object to provide a color video camera using a solid state image pick-up device with high sensitivity and a spectral sensitivity corresponding to the standard color specification system.

To attain the above objects, the color video camera of the present invention comprises means for filtering an image, means for picking up the image through said filtering means to provide an image signal, means connected to said picking up means for generating a first luminance signal, a second luminance signal and color channel signals from the image signal, means connected to the generating means for processing the second luminance signal and the color channel signals to provide color difference signals, and means for producing a color video signal from the first luminance signal and the color difference signals. Further, in the present invention, as the filtering means, an infrared light cut-off filter for cutting off near infrared light of the image above a wavelength λc is provided, λc being set in the range of 670 nm to 780 nm. The cut-off wavelength λc is determined by a wavelength at which the permeability becomes 0.5. Also, in the present invention, a matrix circuit in the generating means has matrix coefficients, and the coefficients for generating the first luminance signal are different from the coefficients for generating the second luminance signal. Further, with regard to the matrix coefficients for generating the second luminance signal, the matrix coefficients for producing the portion of the second luminance signal related to a red component are less than the matrix coefficients for producing the remaining portion of the second luminance signal to reduce the red component of the second luminance signal. In the present invention, preferably, the red color difference signal below a predetermined value is extracted and the extracted red color difference signal is added to the first luminance signal to reduce the red component of the first luminance signal.

The present invention is effective in color video cameras using solid state image pick-up devices, especially those having a complementary filter, for example, the one constructed with a white filter, a cyan filter, a green filter and a yellow filter. The infrared light cut-off filter is made of a multilayer vacuum deposited film.

Concerning the cut-off frequency of the infrared light cut-off filter, in principle the wavelength λc can be increased up to 780 nm, which is the border of visible light.

BRIEF DESCRIPTION OF THE DRAWINGS

FIG. 1a illustrates an explanatory view showing a prior art primary color filter for a color video camera, FIG. 1b illustrates an explanatory view showing a prior art complementary color filter for a color video camera, FIG. 2 illustrates a schematic explanatory view showing random noise in four adjacent filters corresponding to four adjacent picture elements, FIG. 3 illustrates another schematic explanatory view showing random noise in four adjacent filters corresponding to four adjacent picture elements, FIG. 11 shows a circuit diagram of another embodiment of the present invention, and FIGS. 12a to 12d illustrate waveforms of selected portions of the circuit diagram of FIG. 11.

DETAILED DESCRIPTION OF THE PREFERRED EMBODIMENTS

The embodiments of the present invention will be explained with reference to the drawings.

Figure 6:
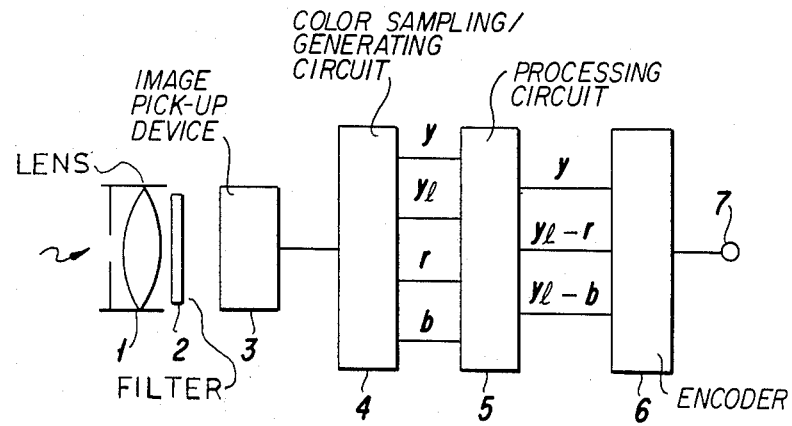
FIG. 6 shows an embodiment of the color video camera of the present invention.

FIG. 6 is a block diagram showing one embodiment (color video camera) of the present invention.

In this Figure, 1 denotes a lens and its mirror-casing, 2 denotes a near infrared cut-off filter with a cut-off wavelength of 700 nm, and 3 denotes image pick-up elements which utilize MOS transistor-type elements such as indicated in the prior art by Ohba et al. The numeral 4 denotes a color sampling/generating circuit, including a matrix circuit, for generating a luminance signal y, a low-band luminance signal $y_l$ used for generating a color difference signal, a red channel signal r and a blue channel signal b, 5 denotes a processing circuit for carrying out Γ-treatment, the correcting treatment taking the characteristics of a color cathode-ray tube (CRT) into consideration, then providing the color difference signals of $(y_l-r)$ and $(y_l-b)$, 6 denotes an encoder for generating a color video signal suited for the standards of NTSC (or PAL, or SECAM) and 7 denotes an output terminal of the color video signal.

Figure 7:
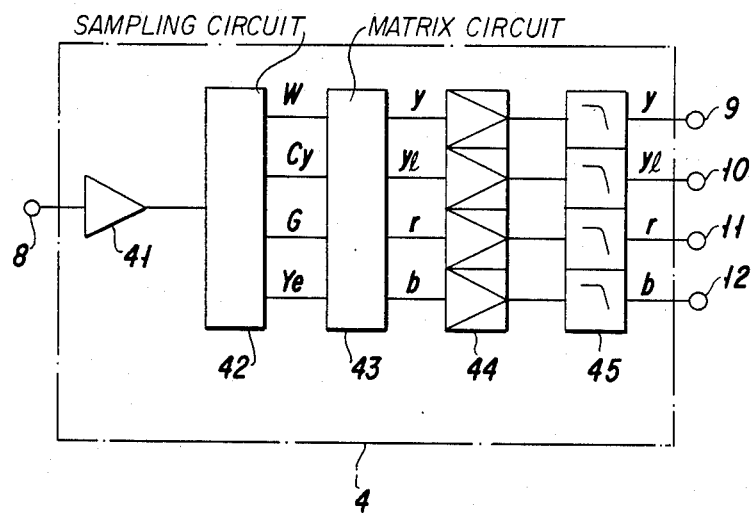
FIG. 7 shows a block diagram of an embodiment of a color sampling/generating circuit 4 shown in FIG. 6.
Figure 8:
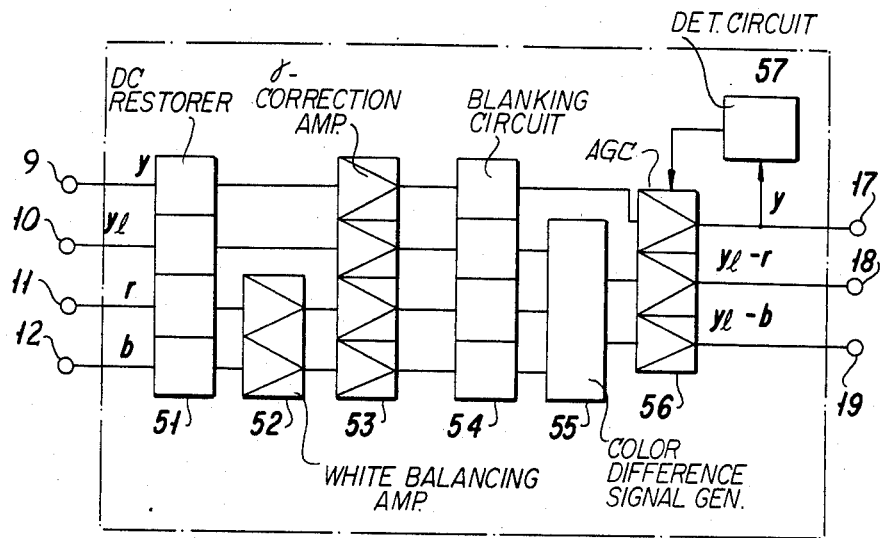
FIG. 8 shows a block diagram of an embodiment of the processing circuit 5 shown in FIG. 6.
Figure 9:
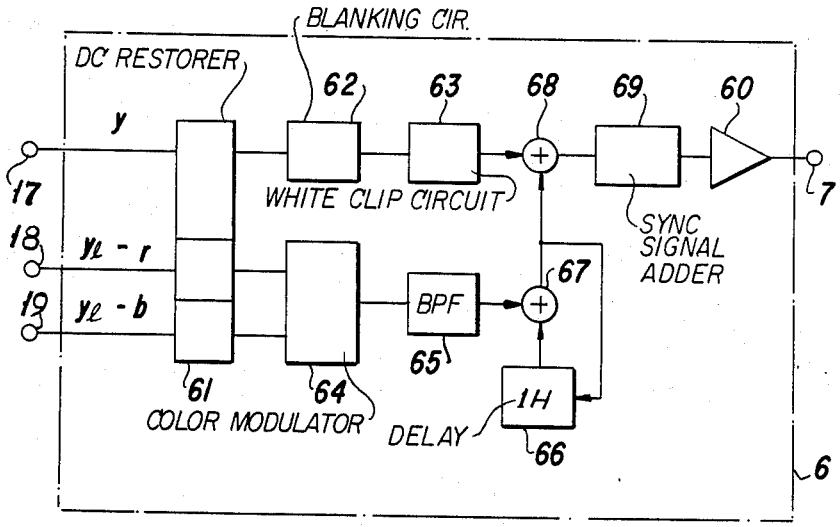
FIG. 9 shows a block diagram of an embodiment of the encoder 6 shown in FIG. 6.

FIGS. 7 to 9 show the details of respective blocks shown in the numerals 4 to 6 of FIG. 6. In those figures, a pulse generating circuit such as a synchronous signal circuit, a image pick-up driving circuit or the like, an iris control circuit and the like are omitted for simplification, because these circuits are not directly related to the flow of signals.

FIG. 7 is a block diagram showing one embodiment of the color sampling/generating circuit 4 indicated in FIG. 6. In this Figure, 8 denotes a signal input terminal to which each signal of W, $C_y$, G and Ye is time-serially input from the image pick-up elements 3. The numeral 41 denotes a preamplifier, 42 denotes a sampling circuit for separating the input signal into W, $C_y$, G, Ye, and 43 denotes a matrix circuit for generating the luminance signal y, the luminance signal having its long wavelength sensitivity reduced. The low band luminance signal $y_l$, the red channel signal r and the blue channel signal b are calculated by means of the following determinant:

$$\begin{pmatrix} y \\ y_l \\ r \\ b \end{pmatrix} = \begin{pmatrix} a_{11} a_{12} a_{13} a_{14} \\ a_{21} a_{22} a_{23} a_{24} \\ a_{31} a_{32} a_{33} a_{34} \\ a_{41} a_{42} a_{43} a_{44} \end{pmatrix} \cdot \begin{pmatrix} W \\ C_y \\ G \\ Ye \end{pmatrix} \quad (16)$$

Also, it is clear that $a_{11}$ to $a_{44}$ are predetermined matrix coefficients.

Then, these signals are passed through a low-pass filter 45 to respective output terminals 9 to 12.

FIG. 8 is a block diagram showing an embodiment of the processing circuit 5. In this Figure, a to 12 denote signal input terminals, 51 denotes a DC restorer, and 52 denotes a white balancing amplifier. 53 denotes a Γ-correcting amplifier, 54 denotes a blanking circuit, 55 denotes a color difference signal generator, 56 denotes a AGC amplifier, 57 denotes a detection circuit, and 17 to 19 denote output terminals of the luminance signal and the color difference singals, respectively.

As apparent from FIG. 8, the low band luminance signal $y_l$ and the color channel signals r and b are used for producing the color difference signals. The luminance signal y is passed through the processing circuit 5, of course, after being amplified, Γ-corrected, etc.

FIG. 9 is a block diagram showing an embodiment of the encoder 6. In this Figure, 17 to 19 denote signal input terminals, 61 denotes a DC restorer, 62 denotes a blanking circuit, 63 denotes a white clipping circuit, and 64 denotes a color modulator for modulating the frequency of the color difference signal and then locking it on the color sub-carrier. Also, a burst signal is generated. The numeral 65 denotes a band-pass filter for the color sub-carrier and 66 denotes a delay line for one horizontal scanning period, 1H delay line, which utilizes a glass delay line or the like. The delay line 66 and an adder 67 compose a tandem-compound filter for reducing color noise by narrowing a vertical color band. The adder circuit 68 serves to add the luminance signal y to the color sub-carrier and the resulting signal is passed through a synchronous signal adder circuit 69 and an output amplifier 60 and then the desired color video signal is output at an output terminal 7.

In the embodiment described above, the distinguishing feature is that the first luminance signal y and the second luminance signal, that is, the low-band luminance signal $y_l$, are independently generated because this feature selects the generation matrix for $y_l$ independently of y so as to enlarge the permissible range of color reproduction.

This enlargement prevents inferior color reproduction even if the cut-off wavelength λc of the near infrared cut-off filter is enlarged.

Since enlarging λc increases the red components, the coefficients $a_{21}$, $a_{24}$ are decreased so as to reduce the red components $y_e$. In the signal $y_l$ generating matrix, the coefficients of the colors including red are less than those of the other colors. This method prevents inferior color reproduction caused by increasing λc and enables easy reproduction of purple having a higher long wavelength reflectance.

Similar to the low-band luminance signal $y_l$, it is desirable to arrange the matrix of the luminance signal y to reduce the red components since the direction thereof means approximating the signal to the standard luminance efficiency curve of CIE. However, there exists the following condition for reducing a moiré in luminance signal;

$$a_{11}W = a_{12}C_y = a_{13}G = a_{14}Y_e \qquad (17)$$

It is mandatory to define the matrix as being satisfied with this condition during colorless time in order to obtain a vivid picture quality. There is no problem in that natural luminance reproduction can be attained by slightly altering formula (17) by lessening the red components of the luminance signal y. It is, however, difficult to satisfy the above-stated two conditions at the same time in accordance with increasing the cut-off wavelength λc. In this instance, it is necessary to reduce luminance of the red object by another method.

Figure 4:
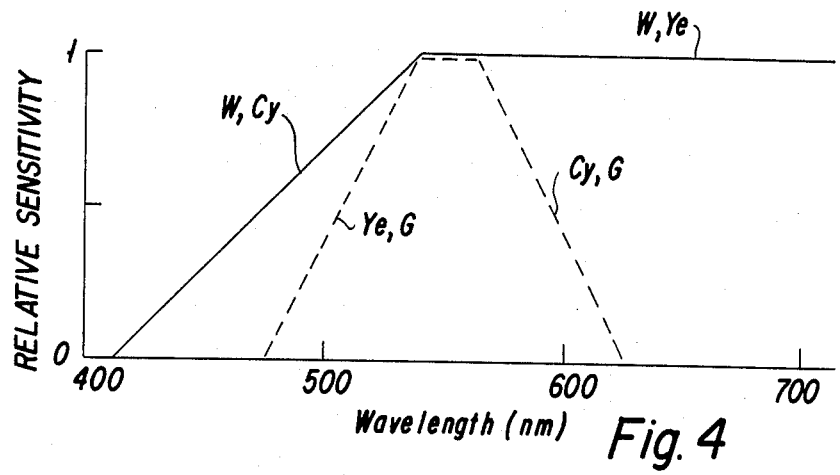
FIG. 4 shows a graph of spectral sensitivity of a solid state image pick-up element.
Figure 5:
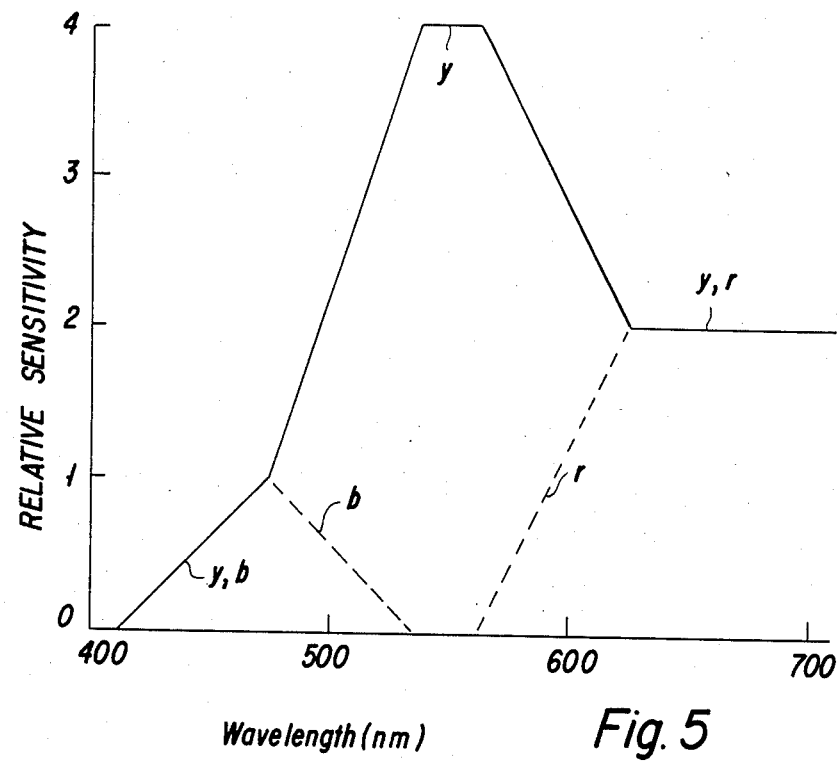
FIG. 5 shows a graph of the spectral sensitivity corresponding to a luminance signal and color channel signals of a solid state image pick-up element.
Figure 10:
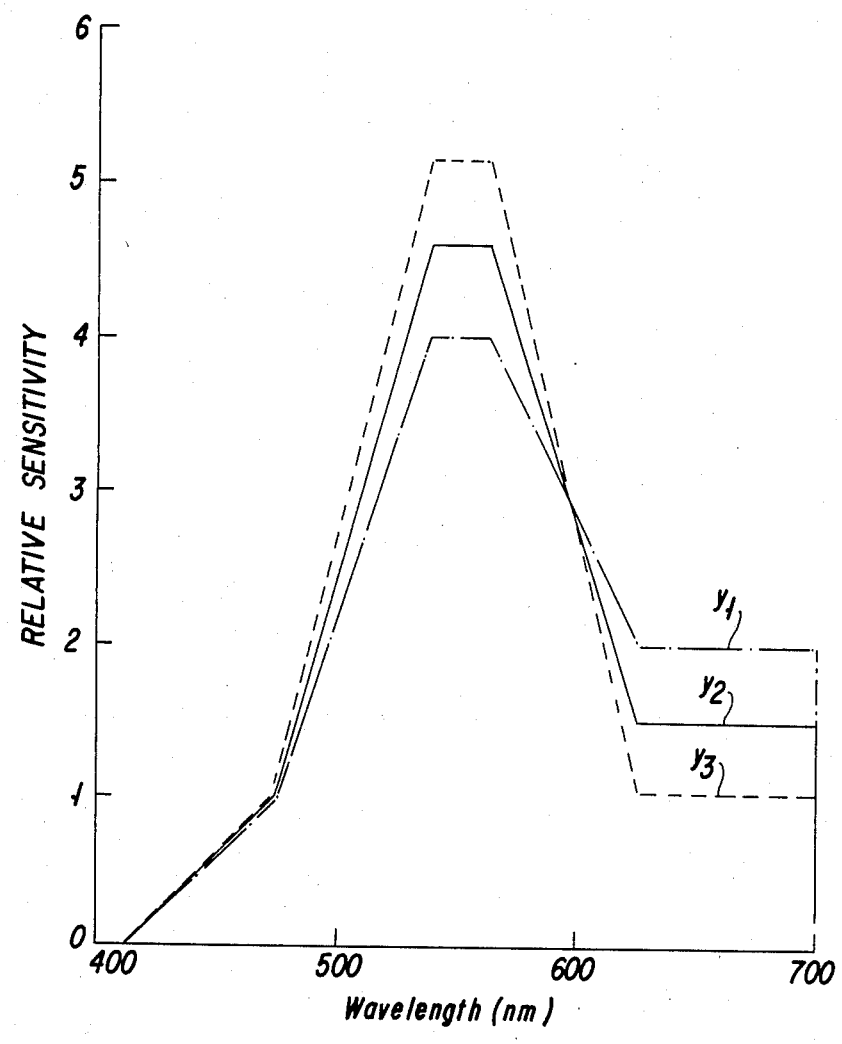
FIG. 10 is a graph of examples of the spectral sensitivity corresponding to the luminance signals in the present invention.

FIG. 10 shows an example of changing the spectral sensitivity characteristics of the luminance signal when changing a luminance-signal-generating matrix. This example is calculated on the basis of the spectral sensitivity shown in FIG. 4 when the cut-off wavelength is 700 nm. $Y_1$ denotes the case that all the matrix coefficients are 1 as indicated in said formula (2).

$y_2$ satisfies formula (17) and the matrix coefficients are:

$$y_2 = 0.69W + 1.32C_y + 1.79G + 0.81Y_e \qquad (18)$$

The proportion of the red components in $y_2$ are reduced in comparison with $y_1$.

In $y_3$ the proportion of the red component has been reduced and the matrix coefficients are shown as follows:

$$y_3 = 2.06C_y + 2.06G + 1.03Y_e \qquad (19)$$

As one example, $y_2$ is a luminance signal y and $y_3$ is a luminance signal for generating a color difference signal $y_l$. Since the luminance signal originally has a higher S/N ratio in regard to random noise and the moiré than the signals r and b, the S/N ratio of the color difference signals do not become inferior even when using a signal with extreme matrix coefficients such as $y_3$ for $y_l$. Note that there exists matrix coefficients having a higher S/N ratio than those shown in the formula (19) so as to obtain the spectral sensitivity characteristic as shown in $y_3$ of FIG. 10.

As described above, it is possible to freely arrange matrix luminance signal coefficients for generating the color difference signal $y_l$; hence, the desired spectral components of $y_l$ can be realized. However, arranging the luminance signal y for luminance reproduction is restricted because of the moiré; hence, it does not necessarily comply with increasing the cut-off wavelength λc.

Consequently, the red object is reproduced at an unnaturally luminous intensity. It is necessary to provide a means to reduce the luminance level of the red object to cope with this problem. A concrete example of this means is shown in FIG. 11. The waveform pattern of the operation of the circuit is shown in FIGS. 12a to 12d, and is based on the assumption of arranging blue, green and red objects against a black background in left to right order.

The circuit shown in FIG. 11 reduces the amplitude of the first luminance signal y supplied to the terminal 17 by the amount that the red color difference signal ($y_l - r$) supplied to the terminal 18 crosses a predetermined value. This circuit is inserted between the processing circuit 5 and the encoder 6 in the embodiment shown in FIG. 6.

In FIG. 11, 81 to 83 denote transistors, respectively, 84 denotes a capacitor, 85 to 90 denote resistors, and 23 denotes a power source terminal. The transistors 81 and 82 and the capacitor 84 construct a clipping circuit for clipping the red color difference signal ($y_l - r$) supplied to terminal 18. The transistor 83 and the resistors 88 and 89 construct an adder. Referring to FIG. 12a, a waveform v1 shows the red color difference signal ($y_l - r$), and the dotted line shows a clipping level set by capacitor 84. In FIG. 12b, a waveform v2 shows emitter voltage of the transistors 81 and 82. The emitter voltage via the resistor 88 is added to the first luminance signal y supplied to the terminal 17. The waveform v3 shown in FIG. 12c indicates the first luminance signal y. The waveform v4 shown in FIG. 12d indicates an emitter voltage of the transistor 83, the base of which receives a signal comprised of the first luminance signal y and the signal produced by clipping the value of v1 over the dotted line shown in FIG. 12a. As a result, the value of the first luminance signal y, in proportion with the amount that the red color difference signal $(y_l-r)$ crosses a predetermined value, is truncated as shown in FIG. 12d. The resistors 88 and 89 serve to add the first luminance signal y(v3) to the truncated value in proportion with the amount that the red color difference signal $(y_l-r)$ falls below the predetermined value. This circuit extinguishes unnatural color sensitivity by reducing luminance of only red objects, except dark objects. The important point is to make the clipping level lower than the colorless level. This prevents increased noise and moiré in regions other than red.

In this embodiment, if an object in the picture is dark, it is impossible to improve the picture quality of the dark object. However, the human eye does not detect any unnaturalness of the dark object in the picture when an unimproved red object is present. It is better to distinguish the lighter red object than to be able to correct the dark object so no disadvantage results from not being able to correct a dark object.

As described above, the present invention can improve the sensitivity of a color video camera by enlarging the S/N ratio of the red signal without causing inferior color reproduction and luminance reproduction. If the present invention is applied to image pick-up elements using solid state image pick-up devices and $\lambda c$ is 700 nm, then it is possible to increase the S/N ratio of the red signal by 5.5 dB at 3200° K., a point higher than that of the conventional value $\lambda c = 650$ nm.

What is claimed is:

1. A color video camera, comprising:
   means for picking up an image to provide an image signal, to which a color filter having a plurality of separate color filter elements is attached,
   means, connected to said picking up means, for generating a first luminance signal, a second luminance signal and color channel signals from said image signal, said generating means including a matrix circuit for producing said first luminance signal, said second luminance signal and said color channel signals from said image signal, said matrix circuit using first matrix coefficients for producing the portion of said second luminance signal related to a red component and second matrix coefficients for producing the portion of said second luminance signal related to another color component, said first matrix coefficients being less than said second matrix coefficients to reduce the red component of said second luminance signal,
   means, connected to said generating means, for processing said second luminance signal and said color channel signals to provide color difference signals, and
   means, connected to said processing means, for producing a color video signal in accordance with said first luminance signal and said color difference signals.

2. The color video camera according to claim 1, wherein:
   said second luminance signal has a lower band frequency characteristic than said first luminance signal.

3. The color video camera according to claim 1, further comprising:
   means for cutting off the near infrared light of said image above a wavelength $\lambda c$.

4. The color video camera according to claim 3, wherein:
   said wavelength $\lambda c$ is set in the range of $670 \text{ nm} \leq \lambda c \leq 780 \text{ nm}.$ 5. The color video camera according to claim 1, wherein said picking up means comprises a solid state image pick up device having a two-dimensional array of photo-electric elements.

6. The color video camera according to claim 5, wherein:
   said color filter comprises a complementary filter.

7. The color video camera according to claim 6, wherein:
   said complementary filter comprises white filter elements, cyan filter elements, green filter elements and yellow filter elements, and said image pick-up device provides a white image signal, a cyan image signal, a green image signal and a yellow image signal as said image signal.

8. The color video camera according to claim 7, wherein:
   said color channel signals comprise a red channel signal and a blue channel signal, said red component includes said white image signal and said yellow image signal, and said another color component includes said cyan image signal and said green image signal.

9. The color video camera according to claim 7, wherein:
   said matrix circuit uses third matrix coefficients different from said first and second matrix coefficients for producing said second luminance signal.

10. The color video camera according to claim 1, wherein said color difference signals comprise a red color difference signal and a blue color difference signal, and further comprising:
    means, inserted between said processing means and said producing means, for extracting said red color difference signal below a predetermined value, and
    means, inserted between said extracting means and said producing means, for adding said extracted signal to said first luminance signal.

11. The color video camera according to claim 10, wherein:
    said extracting means comprises a clipping circuit for clipping said red color difference signal below a colorless level.

12. A color video camera comprising:
    means for filtering an image,
    means for picking up said image through said filtering means to provide a plurality of image signals,
    means, connected to said picking up means, for generating a first luminance signal, a second luminance signal, a red channel signal and a blue channel signal from said image signals,
    means, connected to said generating means, for processing said second luminance signal, said red channel signal and said blue channel signal to provide a red color difference signal and a blue color difference signal,
    means for producing a color video signal from said first luminance signal, said red color difference signal and said blue color difference signal, and wherein:
    said generating means includes a matrix circuit for producing said first luminance signal, said second luminance signal, said red channel signal and said blue channel signal, said matrix circuit uses matrix coefficients to produce said second luminance signal, said matrix coefficients have values that reduce a red component of said second luminance signal.

13. The color video camera according to claim 12, wherein:
said picking up means comprises a solid state image pick-up device having a two-dimensional array of photo-electric elements.

14. The color video camera according to claim 13, wherein:
said filtering means comprises means for cutting off the near infrared light of said image above a wavelength λc.

15. The color video camera according to claim 14, wherein:
said wavelength λc is set in the range of $$670 \text{ nm} \leq \lambda c \leq 780 \text{ nm}.$$

16. The color video camera according to claim 14, wherein:
said filtering means further comprises a complementary color filter filtering the image provided to said solid state image pick-up device.

17. The color video camera according to claim 16, wherein:
said color complementary filter includes a plurality of color filtering elements, a first group of said filtering elements transmitting a red color and a second group of said filtering elements not transmitting the red color.

18. The color video camera according to claim 17, wherein
said solid state image pick-up device provides a first group of said image signals corresponding to said first group of said color filtering elements and a second group of said image signals corresponding to said second group of said color filtering elements.

19. The color video camera according to claim 18, wherein
said matrix coefficients include first matrix coefficients for producing the portion of said second luminance signal from said first group of said image signals and second matrix coefficients for producing the portion of said second luminance signal from said second group of image signals, said first matrix coefficients being less than said second matrix coefficients.

20. The color video camera according to claim 19, wherein
said first group of said color filter elements are a white filter element and a yellow filter element, said second group of said color filter elements are a cyan filter element and a green filter element, said first group of said image signals are a white image signal and a yellow image signal, and said second group of said image signals are a cyan image signal and a green image signal, each of said color filter element being for each of said photo-electric elements.

21. The color video camera according to claim 12, further comprising:
means, inserted between said processing means and said producing means, for extracting said red color difference signal below a predetermined value, and
means, inserted between said extracting means and said producing means, for adding said extracted signal to said first luminance signal to reduce the red component of said first luminance signal.

22. The color video camera according to claim 21, wherein:
said extracting means comprises a clipping circuit for clipping said red color difference signal below a colorless level.

* * * * *